United States Patent
De Groot (10) Patent No.: US 10,024,549 B2
(45) Date of Patent: Jul. 17, 2018

(54) WALL PART, HEAT BUFFER AND ENERGY EXCHANGE SYSTEM

(71) Applicant: ECOVAT IP B.V., Veghel (NL)

(72) Inventor: Adrianus Wilhelmus De Groot, Uden (NL)

(73) Assignee: ECOVAT IP B.V., Veghel (NL)

( * ) Notice: Subject to any disclaimer, the term of this patent is extended or adjusted under 35 U.S.C. 154(b) by 1 day.

(21) Appl. No.: 14/901,679

(22) PCT Filed: Jun. 26, 2014

(86) PCT No.: PCT/NL2014/050422
§ 371 (c)(1),
(2) Date: Dec. 28, 2015

(87) PCT Pub. No.: WO2014/209121
PCT Pub. Date: Dec. 31, 2014

(65) Prior Publication Data
US 2016/0370016 A1 Dec. 22, 2016

(30) Foreign Application Priority Data

Jun. 28, 2013 (NL) ...................................... 2011061

(51) Int. Cl.
*F28D 17/00* (2006.01)
*F24D 3/12* (2006.01)
*F24H 7/04* (2006.01)
*F28D 20/00* (2006.01)
*F24D 11/00* (2006.01)
*F24H 7/00* (2006.01)

(52) U.S. Cl.
CPC .............. *F24D 3/12* (2013.01); *F24D 3/127* (2013.01); *F24D 11/003* (2013.01); *F24H 7/00* (2013.01); *F24H 7/04* (2013.01); *F28D 20/0056* (2013.01); *F28D 2020/0008* (2013.01); *Y02B 10/20* (2013.01); *Y02E 60/142* (2013.01)

(58) Field of Classification Search
CPC ...... F24H 7/00; F24H 7/04; F28D 2020/0008; F24D 3/12; F24D 3/127; F24D 11/003
See application file for complete search history.

(56) References Cited

U.S. PATENT DOCUMENTS

| | | | |
|---|---|---|---|
| 3,780,262 A * | 12/1973 | Rudd | F24F 5/0046 126/400 |
| 2015/0027659 A1 * | 1/2015 | Marques Dias Pinto | F28D 20/0039 165/48.1 |

FOREIGN PATENT DOCUMENTS

WO 9428319 A1 12/1994

* cited by examiner

*Primary Examiner* — Len Tran
*Assistant Examiner* — Gordon Jones
(74) *Attorney, Agent, or Firm* — AEON Law, PLLC; Adam L.K. Philipp; Jonathan Olson (57) ABSTRACT

Heat buffer comprising at least mechanically coupled wall parts, wherein each of the wall parts comprises a substantially plate-like body; a liquid throughflow circuit incorporated in the body; one or more hydraulic couplings accessible from the outer side of the wall part for discharge and supply of liquid to the liquid throughflow circuit and configured for coupling to hydraulic couplings of a similar device; and is coupled at a mutual angle about a substantially vertical axis to a similar wall part, wherein the mechanically coupled devices are connected such that they enclose one space and wherein the heat buffer also comprises a floor and/or cover part for closing the enclosed space on an upper and/or underside.

23 Claims, 6 Drawing Sheets

| Day | Temp. in degrees | Weighting factor | |
|---|---|---|---|
| -5 | 1.00 | 1 | 1.00 Set point -5 |
| -4 | 1.60 | 2 | 3.20 |
| -3 | 2.70 | 3 | 8.10 |
| -2 | 2.30 | 4 | 9.20 |
| -1 | 2.70 | 5 | 13.50 Set point -1 |
| 0 | 3.10 | 6 | 18.60 Today |
| +1 | 3.00 | 7 | 21.00 Forecast +1 |
| +2 | 2.30 | 8 | 18.40 |
| +3 | 5.10 | 7 | 35.70 |
| +4 | 7.10 | 6 | 42.60 |
| +5 | 7.30 | 5 | 36.50 Forecast +5 |

Average outdoor temp.: 3.85

| | | | | | |
|---|---|---|---|---|---|
| 0 | 20130405 | 6 | 53 | 31 | 1156 |
| +1 | 20130406 | -18 | 64 | 30 | 925 |
| +2 | 20130407 | -27 | 69 | 23 | 1303 |
| +3 | 20130408 | 0 | 90 | 51 | 1985 |
| +4 | 20130409 | 50 | 90 | 71 | 1274 |
| +5 | 20130410 | 60 | 91 | 73 | 1421 |

| Weighted Temp.: | Set point | |
|---|---|---|
| | 18 | 22.00 |
| | 17 | 22.45 |
| | 16 | 22.89 | -0.45 |
| | 15 | 23.34 | -0.45 |
| | 14 | 23.79 | -0.45 |
| | 13 | 24.23 | -0.45 |
| | 12 | 24.68 | -0.45 |
| | 11 | 25.13 | -0.45 |
| | 10 | 25.57 | -0.45 |
| | 9 | 26.02 | -0.45 |
| | 8 | 26.46 | -0.45 |
| | 7 | 26.91 | -0.45 |
| | 6 | 27.36 | -0.45 |
| | 5 | 27.80 | -0.45 |
| | 4 | 28.25 | -0.45 |
| | 3 | 28.70 | -0.45 |
| | 2 | 29.14 | -0.45 |
| | 1 | 29.59 | -0.45 |
| | 0 | 30.04 | -0.45 |
| | -1 | 30.48 | -0.45 |
| | -2 | 30.93 | -0.45 |
| | -3 | 31.38 | -0.45 |
| | -4 | 31.82 | -0.45 |
| | -5 | 32.27 | -0.45 |
| | -6 | 32.71 | -0.45 |
| | -7 | 33.16 | -0.45 |
| | -8 | 33.61 | -0.45 |
| | -9 | 34.05 | -0.45 |
| | -10 | 34.50 | |
| | | 12.50 | |
| | Per Degree | 0.45 | |

WALL PART, HEAT BUFFER AND ENERGY EXCHANGE SYSTEM

The present invention relates to a wall part for manufacturing a heat buffer, a thus manufactured heat buffer and an energy exchange system in which such a buffer is incorporated.

Energy exchange systems are per se known. Their general principle is to store heat and cold at the moment that there is a surplus and to utilize this heat at times of demand, particularly seasonal storage from summer to winter. This usually involves solar heat and thermal heat generated in particular with heat pumps which are controlled with their own current from their own PV panels which is stored underground, wherein a liquid such as water and/or glycol is used to provide heat capacity, cold capacity or a combination of the two.

The known systems do of course meet a certain demand but they also have diverse drawbacks, particularly in respect of a low efficiency or a limited degree of storage capacity, scalability or applicability in an existing built-up area.

It is therefore an object of the present invention to obviate at least some of the above stated drawbacks or to provide a usable alternative to the prior art.

The invention provides for this purpose a heat buffer according to claim 1 and a wall part for forming a heat buffer, comprising a substantially plate-like body, at least one liquid throughflow circuit incorporated in the body, one or more hydraulic couplings accessible from the outer side of the wall part for discharge and supply of liquid to the liquid throughflow circuit and configured for coupling to hydraulic couplings of a similar wall part.

In an embodiment at least some of the wall parts will be coupled and connected by means of the so-called Tichelmann connection principle, whereby uniform pressure losses and attendant energy-saving use of the pumps for circulating the liquid can be achieved.

The wall part according to the present invention provides the option of forming, by means of coupling to similar or identical wall parts, an assembly of optionally hydraulically coupled or connected parts, and thus forming a heat buffer with a storage capacity of any desired size. The wall part can for this purpose be for instance substantially plate-like, rectangular, trapezium-shaped or optionally curved. The liquid throughflow circuit is configured to form part of or to form a heat exchanger. An assembly of wall parts according to the present invention is for this purpose brought into contact with a medium with a suitable heat capacity, which can in particular be groundwater. For this specific purpose the wall parts are then placed under the ground, for instance in the groundwater.

The wall part according to the invention can be a latticework for holding a hose or tube and can also be provided with such a hose or tube intended for placing in a recess which is provided for the purpose in the ground and which is then poured full of for instance concrete. (Nets with) conduit registers cast into a (thus prefab) concrete element can however also be applied. Such elements can be embedded directly in the ground or also in still liquid concrete.

The parts can take an insulated form, wherein the liquid throughflow circuit can have been or be formed by a hose or tube cast into the concrete or a conduit register arranged on the wall part.

Such prefab parts in particular can be provided with a seal for sealing a contact surface of the two wall parts in liquid-tight and preferably thermally sealed manner in the situation where they are coupled to a similar wall part.

The mechanical coupling is preferably configured to couple similar devices with their walls at an angle to each other. An endless assembly, particularly a polygon, which encloses the medium can in this way be formed by mutually connecting wall parts according to the present invention. The wall parts can have for instance a trapezium-shaped cross-section for this purpose.

In an embodiment a first wall part can be coupled to a similar second wall part by means of a mechanical coupling, for instance comprising at least one protrusion and one hook, wherein the protrusion is provided on the first wall part and the hook is provided on the second wall part. It is of course possible to envisage a plurality of protrusions and hooks, wherein it is also possible for a wall part to be equipped with both protrusions and hooks for the purpose of connecting one adjacent wall part.

For the purpose of installing an underground buffer it is recommended that the protrusion and the hook are placed such that the second wall part can be coupled substantially in vertical direction to the first wall part. Wall parts can in this way be placed in the ground and connected to each other one by one.

The wall parts according to the present invention preferably have a width of between one and four meters, a height of between ten and twenty-five meters and a thickness of between zero and one and a half meters.

The present invention also relates to a heat buffer comprising at least two wall parts as according to any of the foregoing claims, and in particular wherein the mechanically coupled devices are connected such that they enclose a space. They more preferably also comprise a floor and/or cover part for closing the enclosed space on an upper and/or underside. A desired volume of the heat buffer lies between 15 and 25,000 $m^3$ and can even rise to 60,000 $m^3$. The aim according to the present invention is the largest possible tank so that, with a relatively small difference in temperature, the highest possible energetic storage capacity, and therefore the highest possible efficiency, can be obtained.

In order to obtain an exceptionally high efficiency the heat buffer can comprise a plurality of preferably connected groups of coupled wall parts arranged around each other. An exemplary configuration comprises for instance concentric circles or polygons, although a zigzag or meandering form can also be envisaged. The heat buffer is filled with a medium for storing energy, for which purpose groundwater or other liquid can for instance be chosen.

The heat buffer can also comprise a plurality of preferably connected groups of coupled wall parts arranged one above another, wherein a thermal barrier, for instance formed by a partition or otherwise substantially horizontally extending element such as a floor part, is arranged in each case between the wall parts arranged one above another in order to make use in this way of the natural stratification of water layers due to the temperature differences.

The groups arranged around or above each other, which thus form their own compartments, can be used to store volumes of the medium with different temperature, wherein it is possible to draw each time from the compartment with the temperature most suitable for that moment.

The efficiency of the heat buffer can be increased considerably when it is surrounded by an extra outer wall. Such an outer wall can be arranged in the ground prior to placing of the heat buffer. A technique suitable for the purpose is the per se known cutter soil mixing. A space is cleared here in the ground, for instance by means of drilling or milling, which space is filled with a material, such as cement, which is curable optionally in combination with moisture present in the ground.

In a preferred embodiment of the present invention the outer wall is placed at a distance from the heat buffer (to be formed), so that a cavity results. This cavity can be left empty or be filled with an insulating material of choice which, just as the content of the buffer, can be water.

Such a buffer can be manufactured by placing a cavity in the above described manner, subsequently positioning the wall parts and then fixing these in their positions. Use can be made for this fixing of a clamping means of controllable size, for instance a bag which is placed between the outer wall and the wall parts and is then filled, for instance with a cement.

The present invention further relates to an energy exchange system, comprising a heat buffer as described above, a hydraulic heat exchange system connected to the liquid throughflow circuit of at least one of the wall parts of the heat buffer, comprising at least one heat absorbing device for absorbing heat or cold, relinquishing thereof to a liquid and carrying the liquid to which the heat has been relinquished to the liquid throughflow circuit; and at least one heat generating device for receiving liquid carried through the liquid throughflow system and generating heat, such as a heating system in a building. Due to the use of the efficient buffer according to the invention such a device has an exceptionally high efficiency. It is hereby even possible in an embodiment for the energy exchange system to comprise a plurality of heat generating devices placed in a plurality of buildings, and to mutually couple a plurality of buffers so that a network of buffers is created.

In a preferred embodiment of the present invention the energy exchange system comprises a control system for controlling the liquid flow between the heat exchange system, the heat absorbing device and the heat generating device. Such a control system controls the heat supply and discharge to and from the heat buffer.

The control system according to the present invention is characterized in a preferred embodiment in that the control system is configured to receive a temperature forecast for the relevant location, wherein the control system is configured to store energy in or generate energy from the tank on the basis of the received temperature forecast.

The temperature forecast can be obtained from a meteorological institute, via an RSS feed or in other per se known manner. The energy exchange system according to the present invention is still more particularly characterized in that the control system is configured to store energy in or generate it from the heat buffer on the basis of the temperatures measured in the past and the temperatures expected in the future, wherein each measuring point in the past and each measuring point in the future is weighted with its own weighting factor. The quantity of energy from the buffer to be generated or absorbed is determined on the basis of such a weighting factor for the purpose of bringing a building to and/or keeping it at a determined temperature. In a further embodiment the energy from the building is used to charge the buffer and carry cold from the buffer to the building. Because the tank is divided into different temperature levels created by the natural stratification of the water in the tank, the correct level of charging and discharging can be determined by means of control engineering.

In a further embodiment of the present invention measuring points in the past are weighted with a lower factor than measuring points in the future. In yet another embodiment the control system is configured to adjust the control on the basis of the difference between the temperature forecast and an actually measured temperature, such as that in a connected building and/or the buffer tank.

The invention will now be elucidated with reference to the following figures. Herein.

Figure 1A:
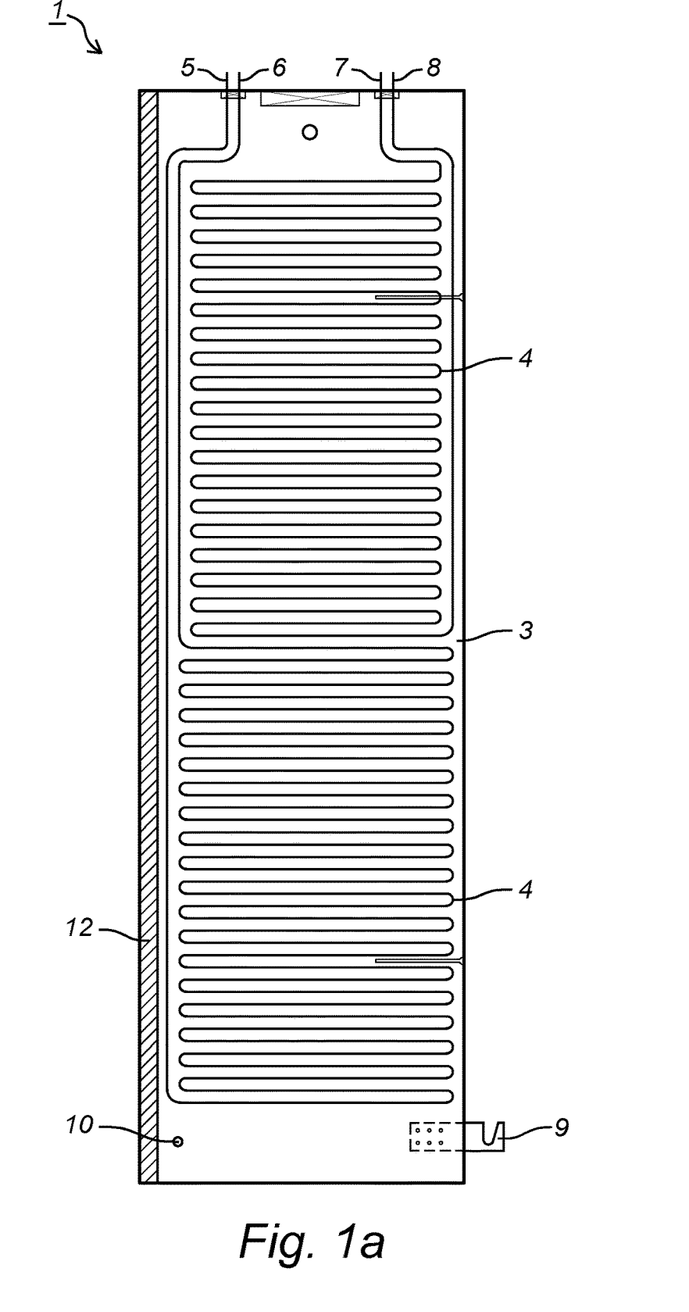
FIGS. 1a,b show a sectional view of a wall part according to the present invention.
Figure 1B:
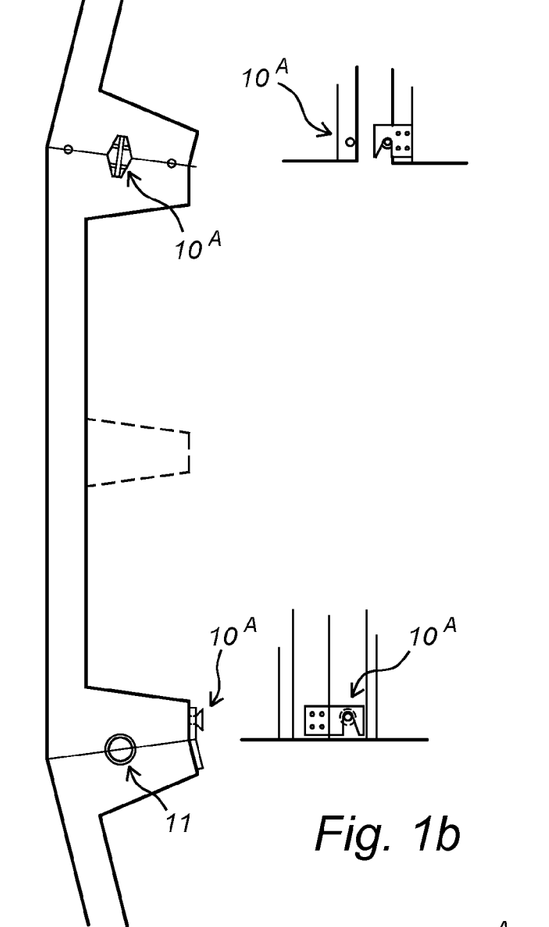
Figure 1C:
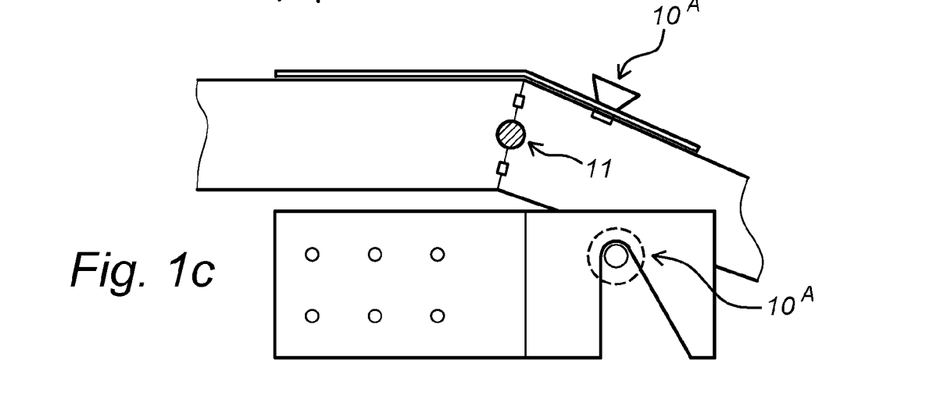
FIG. 1c shows the protrusion and hook construction of FIGS. 1a and 1b in detail.

FIG. 1a shows a sectional view 1 of a wall part 2 according to the present invention, comprising a substantially plate-like body 3 with a liquid throughflow circuit 4 incorporated in the body, and four hydraulic couplings 5, 6, 7, 8 accessible from the outer side of wall part 2 for discharge and supply of liquid to the liquid throughflow circuit 4 and configured for coupling to hydraulic couplings of a similar device. Also visible is a mechanical coupling 9, 10 provided on the wall part and comprising a protrusion 10 and a hook 9 for coupling wall part 2 to at least one similar wall part. Finally shown is a seal 12 for liquid-tight sealing of a contact surface of the two wall parts in the situation where they are coupled to a similar wall part. FIG. 1b shows a top view of an alternative embodiment 2A. Shown in protrusion 10A is a seal 11, and it can be clearly seen that the cross-section of this embodiment is a trapezium-shaped cross-section. It can also be seen that protrusions 10A and the associated hooks can be located on the outer side of a wall part as well as on an end surface. FIG. 1c shows the protrusion and hook construction of FIGS. 1a and 1b in detail.

Figure 2:
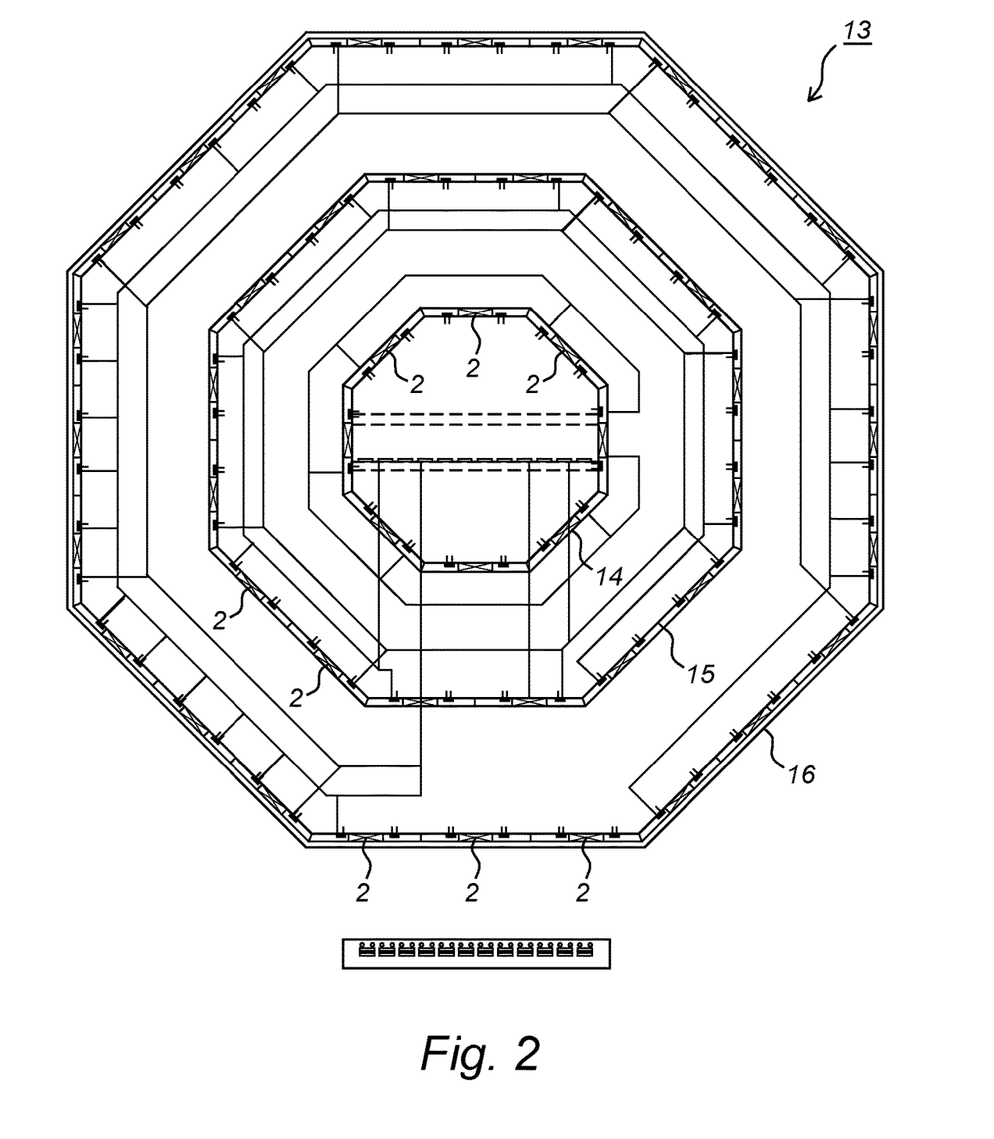
FIG. 2 shows a top view of a buffer according to the present invention.

FIG. 2 shows a top view 13 of a buffer according to the present invention, consisting of a plurality of preferably connected groups 14, 15, 16 of coupled wall parts 2 arranged around each other.

Figure 3A:
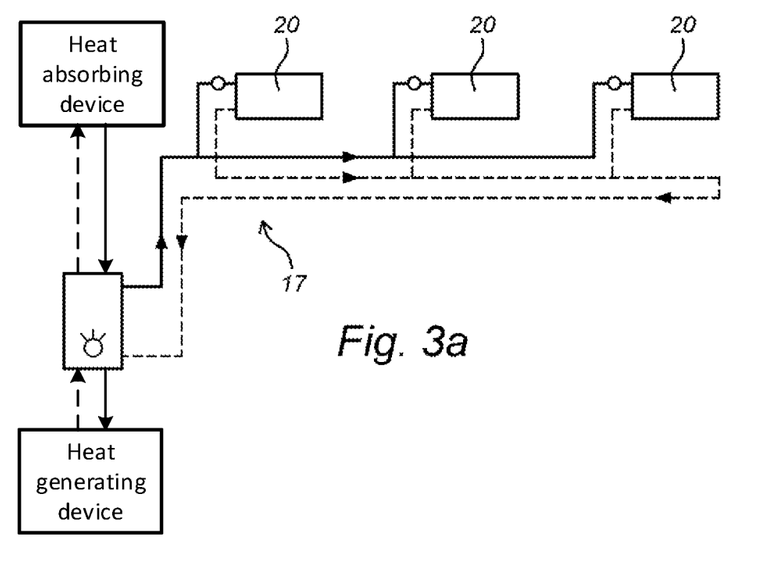
FIGS. 3a-c show schematic views of the hydraulic system of an energy storage system according to the present invention.
Figure 3B:
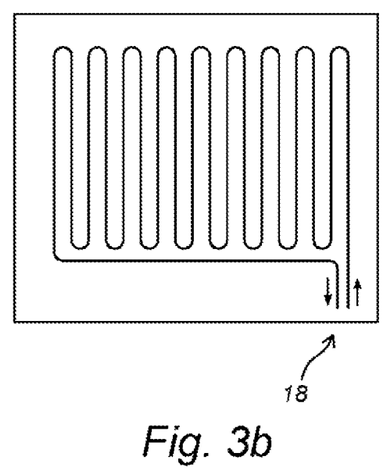
Figure 3C:
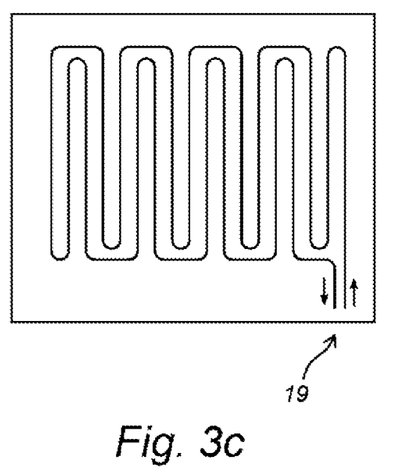

FIGS. 3a, b, c show schematic views 17, 18, 19 of the mutual hydraulic coupling of wall parts 20 according to the present invention in accordance with the Tichelmann principle.

Figure 4:
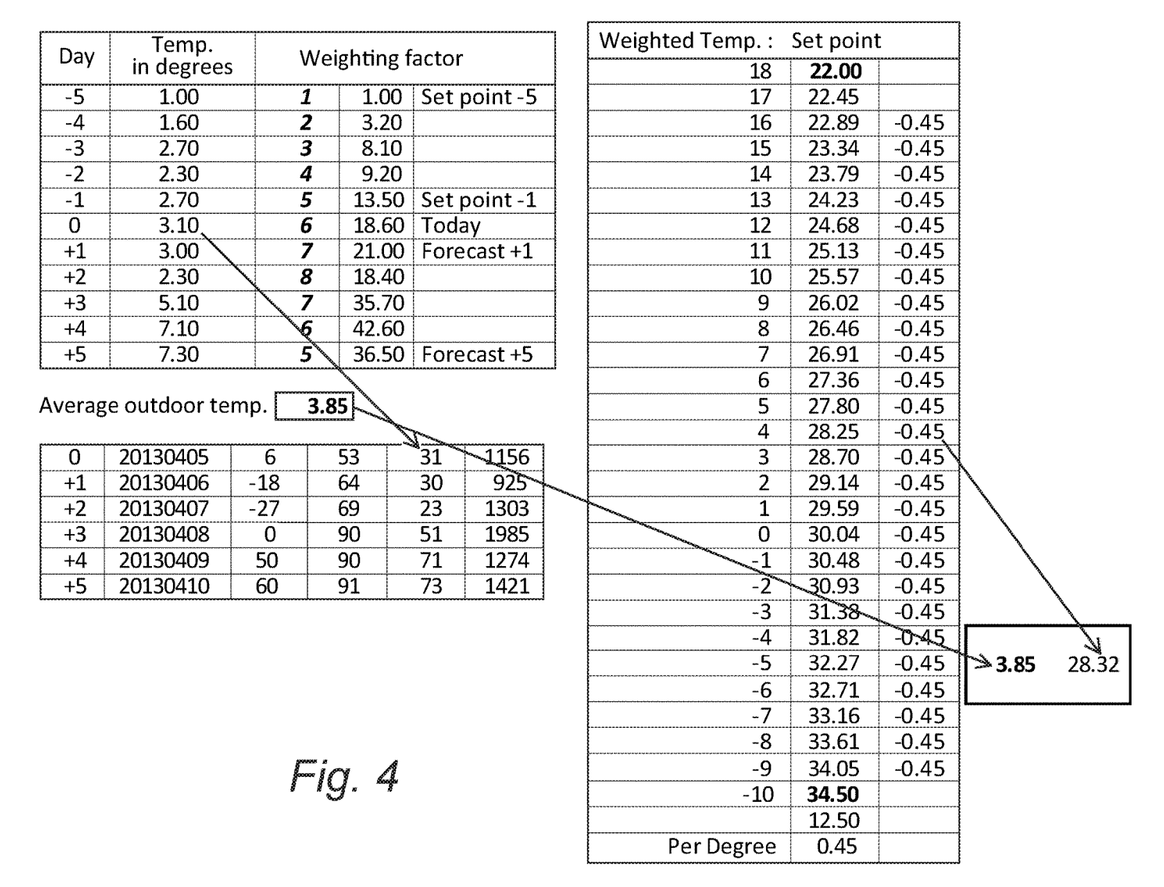
FIG. 4 shows an example of a weighting of measuring points in a system according to the present invention.

FIG. 4 shows an example of a weighting of measuring points in a system according to the present invention, which adheres to the general guidelines according to the ISSO publication 29 pursuant to the Building Decree 2012, including amendments dated 17 Apr. 2012. The guidelines provided in the ISSO are based on the knowledge gathered from a literature search and experiments. The static and dynamic heat flows of installations have been simulated using computer models. The results of the simulation models have been verified by field measurements, which have contributed toward the final form of these models. For practical use a manual calculation method has been derived with which an installation can be designed in reliable manner on the basis of the building characteristics and comfort requirements. The calculation method consists of eight steps.

1. determining the heat loss through outer walls;
2. determining heat losses to adjacent buildings;
3. determining the heat loss through the roof;
4. determining the heat loss through the floor;
5. determining infiltration or ventilation losses;

6. determining the stationary heat losses;
7. determining the heating-up surcharge;
8. determining the total capacity to be installed.

The calculations of internal heat production and solar irradiation are taken into account here. Determining the capacity to be supplied from the tank consists of the eight steps listed above; six for determining the stationary heat demand, one for the heating-up surcharge and one for the capacity to be finally determined and supplied from the tank at a determined point in time. This capacity is determined every 30 minutes by calculating step 1 to 8 with addition or subtraction of information on the internal heat production and solar irradiation received from the building. An adaptive temperature limit value can in this way be provided in accordance with FIG. 5.

Figure 5:
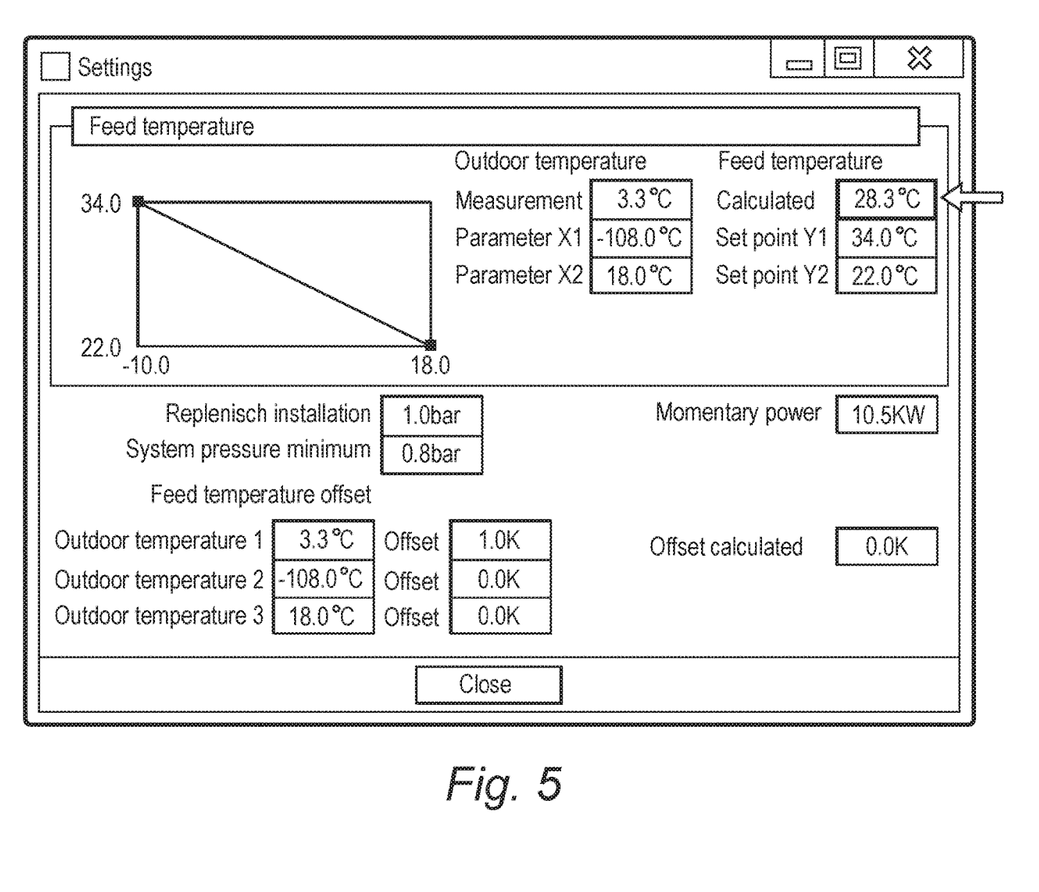
FIG. 5 shows a user interface of software for adjusting the control system according to the present invention.

FIG. 5 shows a user interface of software for adjusting the control system according to the present invention.

FIG. 6 shows an embodiment 31 wherein an outer wall 33 is arranged around wall parts 32 for the purpose of thus forming a cavity 34. Wall parts 32 are held in place by clamping elements formed by bags 35 and 36, which are shown both before (35A, 36A) being filled with a filler such as cement and after being filled with this filler.

The above stated figures are purely illustrative and in no way limit the scope of protection of the present invention as laid down in the following claims.

The invention claimed is:

1. Energy exchange system, comprising:
   a. An underground heat buffer for holding a medium for storing thermal energy, the buffer comprising coupled wall parts, each of the wall parts:
      i. comprising a substantially plate-like body discrete from and configured to be connectable to an adjacent wall part;
      ii. comprising a liquid throughflow circuit incorporated with the plate-like body;
      iii. comprising one or more hydraulic couplings accessible from the outer side of the wall part for discharge and supply of liquid to the liquid throughflow circuit and configured for coupling to hydraulic couplings of another wall part;
      iv. positioned for providing heat-exchanging of said medium and liquid in said liquid throughflow circuit, and
      v. coupled at a mutual angle about a substantially vertical axis to an adjacent wall part to enclose one space for holding said medium; and
   b. A hydraulic heat exchange system connected to the liquid throughflow circuit of at least one of the wall parts of the heat buffer, comprising at least:
      i. A heat absorbing device for
         1. absorbing heat;
         2. relinquishing this heat to a liquid;
         3. carrying the liquid to which the heat has been relinquished to the liquid throughflow circuit; and at least
      ii. A heat generating device for
         1. receiving liquid carried through the liquid throughflow system; and
         2. generating heat, such as a heating system in a building.

2. Energy exchange system as claimed in claim 1, wherein the heat generating device is a heating system in a building, the energy exchange system comprising a plurality of heat generating devices placed in a plurality of buildings.

3. Energy exchange system as claimed in claim 1, comprising a control system for controlling the liquid flow between the heat exchange system, the heat absorbing device and the heat generating device.

4. Energy exchange system as claimed in claim 3, wherein the control system is configured to receive a temperature forecast; and
wherein the control system is configured to store energy in or generate energy from the underground heat buffer on the basis of the received temperature forecast.

5. Energy exchange system as claimed in claim 3, wherein the control system is configured to store energy in or generate it from the heat buffer on the basis of the temperatures measured in the past and the temperatures expected in the future, wherein each measuring point in the past and each measuring point in the future is weighted with its own weighting factor.

6. Energy exchange system as claimed in claim 5, wherein measuring points in the past are weighted with a lower factor than measuring points in the future.

7. Energy exchange system as claimed in claim 2, comprising a control system for controlling the liquid flow between the heat exchange system, the heat absorbing device and the heat generating device.

8. Energy exchange system as claimed in claim 7, wherein the control system is configured to receive a temperature forecast; and
wherein the control system is configured to store energy in or generate energy from the underground heat buffer on the basis of the received temperature forecast.

9. Energy exchange system as claimed in claim 4, wherein the control system is configured to store energy in or generate it from the heat buffer on the basis of the temperatures measured in the past and the temperatures expected in the future, wherein each measuring point in the past and each measuring point in the future is weighted with its own weighting factor.

10. Energy exchange system as claimed in claim 7, wherein the control system is configured to store energy in or generate it from the heat buffer on the basis of the temperatures measured in the past and the temperatures expected in the future, wherein each measuring point in the past and each measuring point in the future is weighted with its own weighting factor.

11. Energy exchange system as claimed in claim 8, wherein the control system is configured to store energy in or generate it from the heat buffer on the basis of the temperatures measured in the past and the temperatures expected in the future, wherein each measuring point in the past and each measuring point in the future is weighted with its own weighting factor.

12. Energy exchange system as claimed in claim 9, wherein measuring points in the past are weighted with a lower factor than measuring points in the future.

13. Energy exchange system as claimed in claim 10, wherein measuring points in the past are weighted with a lower factor than measuring points in the future.

14. Energy exchange system as claimed in claim 11, wherein measuring points in the past are weighted with a lower factor than measuring points in the future.

15. Energy exchange system as claimed in claim 1, wherein:
the heat buffer also comprises a floor and/or cover part for closing the enclosed space on an upper and/or underside.

16. Energy exchange system as claimed in claim 15, wherein the wall parts are coupled mechanically, comprising a mechanical coupling provided on at least one of the wall parts for coupling the wall part to at least one adjacent wall part.

17. Energy exchange system as claimed in claim 15, wherein the heat buffer comprises a plurality of connected groups of coupled wall parts arranged around each other.

18. Energy exchange system as claimed in claim 15, wherein the heat buffer comprises a plurality of connected groups of coupled wall parts arranged one above another, wherein a thermal insulation is arranged between the wall parts arranged one above another.

19. Energy exchange system as claimed in claim 15, wherein the heat buffer has a volume of between 15 and 60,000 m3 and in particular between 15 and 25,000 m3.

20. Energy exchange system as claimed in claim 15, wherein the heat buffer is filled with a medium for storing energy, in particular with groundwater.

21. Energy exchange system as claimed in claim 15, wherein the heat buffer comprises an outer wall surrounding the wall parts at a distance, thus forming a cavity.

22. Energy exchange system as claimed in claim 21, wherein the cavity is filled with an insulating material, in particular water.

23. Energy exchange system as claimed in claim 21, wherein the heat buffer comprises a clamping means arranged at least partially in the cavity for holding the wall parts at a distance relative to the outer wall.

* * * * *